United States Patent
Rosati

(10) Patent No.: US 9,594,896 B2
(45) Date of Patent: Mar. 14, 2017

(54) TWO FACTOR AUTHENTICATION USING NEAR FIELD COMMUNICATIONS

(71) Applicant: Certicom Corp., Mississauga (CA)

(72) Inventor: Anthony Rosati, Ottawa (CA)

(73) Assignee: BlackBerry Limited, Waterloo (CA)

( * ) Notice: Subject to any disclaimer, the term of this patent is extended or adjusted under 35 U.S.C. 154(b) by 102 days.

(21) Appl. No.: 13/723,429

(22) Filed: Dec. 21, 2012

(65) Prior Publication Data
US 2014/0181955 A1 Jun. 26, 2014

(51) Int. Cl.
| | |
|---|---|
| *G06F 12/14* | (2006.01) |
| *G06F 21/44* | (2013.01) |
| *G06F 21/35* | (2013.01) |
| *G07C 9/00* | (2006.01) |
| *H04W 4/00* | (2009.01) |
| *H04W 12/06* | (2009.01) |
| *H04L 29/06* | (2006.01) |

(52) U.S. Cl.
CPC ............. *G06F 21/44* (2013.01); *G06F 21/35* (2013.01); *G07C 9/00174* (2013.01); *G07C 9/00309* (2013.01); *H04W 4/008* (2013.01); *H04W 12/06* (2013.01); *G07C 2009/0042* (2013.01); *G07C 2209/14* (2013.01); *H04L 63/0492* (2013.01); *H04L 2463/082* (2013.01)

(58) Field of Classification Search
CPC .................................................. H04W 4/008
See application file for complete search history.

(56) References Cited

U.S. PATENT DOCUMENTS

| | | | |
|---|---|---|---|
| 7,757,281 B2* | 7/2010 | Field et al. | 726/17 |
| 8,150,374 B2 | 4/2012 | Lowe | |
| 8,238,973 B2 | 8/2012 | Kurz | |
| 2005/0033983 A1* | 2/2005 | Takekawa | G06F 21/31 726/2 |
| 2006/0070125 A1* | 3/2006 | Pritchard | H04L 63/0846 726/18 |
| 2008/0172294 A1* | 7/2008 | McGuire | G06Q 30/0226 705/14.27 |
| 2009/0143104 A1 | 6/2009 | Loh | |
| 2010/0306533 A1* | 12/2010 | Phatak | 713/156 |
| 2011/0039494 A1 | 2/2011 | Shon et al. | |
| 2011/0130120 A1 | 6/2011 | Hoeksel | |

(Continued)

FOREIGN PATENT DOCUMENTS

EP 1919123 A1 * 5/2008

OTHER PUBLICATIONS

European Search Report, EP Application No. 12198920.6, Mailed May 24, 2013.

(Continued)

*Primary Examiner* — Mohammed Waliullah
(74) *Attorney, Agent, or Firm* — Moffat & Co.

(57) ABSTRACT

There is provided a method and apparatus for communications using short range communications such as Near Field Communications (NFC). A mobile device comprising an NFC subsystem provides a dynamic credential for use to login to a network requiring two factor authentication. A terminal used for logging in to the network is associated with an NFC reader, and bringing the NFC device in proximity to the NFC reader provides the terminal with the dynamic credential required for two factor authentication.

26 Claims, 7 Drawing Sheets

(56) References Cited

U.S. PATENT DOCUMENTS

| | | | |
|---|---|---|---|
| 2011/0287716 A1 | 11/2011 | Lortz | |
| 2012/0174189 A1* | 7/2012 | Lim | H04L 63/067 726/3 |
| 2012/0185697 A1* | 7/2012 | Buer | G06F 21/34 713/185 |
| 2012/0190354 A1* | 7/2012 | Merrien | H04W 4/001 455/422.1 |
| 2012/0207305 A1 | 8/2012 | Gallo et al. | |
| 2012/0295587 A1 | 11/2012 | Paya | |
| 2014/0115341 A1* | 4/2014 | Robertson | H04L 9/3228 713/183 |
| 2014/0298016 A1* | 10/2014 | Ekberg | G06F 21/335 713/168 |

OTHER PUBLICATIONS

US Dept of Commerce/National Institute of Standards and Technology,Federal Information Processing Standards Publication (FIPS Pub 196) "Entity Authentication Using Public Key Cryptography" (Feb. 18, 1997).

European Patent Office, Office Action, Application No. 12198920. 6-1870, Dec. 12, 2014.

Canadian Intellectual Property Office, Office Action, Application No. 2836890, Apr. 17, 2015.

Canadian Intellectual Property Office, Office Action, Application No. 2836890, May 30, 2016.

European Patent Office, Office Action on Application No. 12198920.6, Issued on Jul. 20, 2016.

Anonymous: "Applet—Wikipedia, the free encyclopedia", URL: https://en.wikipedia.org/w/index.php?title=Applet &oldid=525348672, Retrieved as early as Nov. 28, 2012.

* cited by examiner

TWO FACTOR AUTHENTICATION USING NEAR FIELD COMMUNICATIONS

FIELD OF THE DISCLOSURE

The present disclosure relates to a communications device equipped with near field communications capabilities and applications related thereto.

BACKGROUND

Two factor authentication is one technique used to ensure access is only granted to authorized users. In two factor authentication, a user is required to provide two authentication parameters. For example, one parameter might be a password or a PIN known to the user and to the authentication server or computing device.

A second factor might be a dynamic credential. For example, a user might be required to carry a key fob or other device having a display which provides a fixed length number. The number might change periodically such as every 60 seconds. The algorithm used to generate the dynamic credential is known to both the key fob and the authentication server or computing device, and thus if the same seed, such as a current time, is used, the number should match in both locations. The current time may be based on a mutually known time, such as a network time received from a network element, a clock on a device that is periodically synchronized, the exchange of the current time between a reader and a device, among other possibilities.

Currently a user must input the number that is seen on the key fob for the second factor of the two factor authentication. The entering of a number is both cumbersome and prone to errors.

Other examples of two factor authentication also exist. For example, challenge response tokens may have a host send a random challenge and the token perform some computation based on a secret key to generate a response. The host has related knowledge of the secret key and can thus verify the response. Similar to time based tokens, the response must be entered, which is again cumbersome and prone to error.

BRIEF DESCRIPTION OF THE DRAWINGS

The present application will be better understood with reference to the drawings, in which.

DETAILED DESCRIPTION OF THE DRAWINGS

Figure 1:
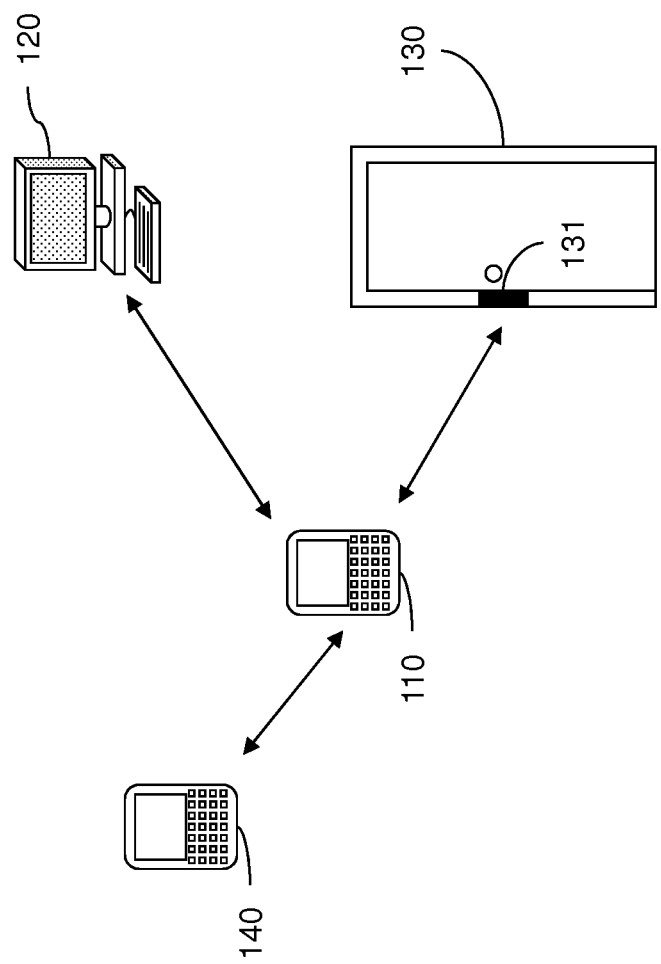
FIG. 1 is a block diagram of a mobile device and an NFC reader in accordance with the present disclosure.

The present disclosure provides for a method at an short range communications capable device for providing a dynamic credential to a terminal, the method comprising: receiving, utilizing near field communications, an application identifier from a reader associated with the terminal; computing, within a secure element of the short range communications capable device, the dynamic credential; and transmitting the dynamic credential to the reader.

The present disclosure further provides a short range communications capable device for providing a dynamic credential to a terminal, the short range communications capable device comprising: an antenna; a controller; and at least one secure element, wherein the antenna, controller and at least one secure element are configured to: receive an application identifier from a reader associated with the terminal; compute, within a secure element of the short range communications capable device, the dynamic credential; and transmit the dynamic credential to the reader.

Communication devices may now be equipped with short range communications or proximity based communications. One example of such short range communications includes near field communications (NFC). However, other short range proximity based communications are also possible and in some cases may include Bluetooth™, ZigBee™, IrDA, among others. The present disclosure is described below with regards to NFC, but this is not meant to be limiting.

NFC capabilities in a communications device allow small data transfers over very short distances. NFC is a short range radio communications technology, typically limited in range to approximately 4 cm. NFC typically allows small devices such as smart cards to interact with other devices merely by being placed in close proximity to the other device. NFC may be used in a variety of applications, including smart posters to provide a mobile device with data related to the poster, such as a uniform resource locator (URL), payment, ticketing to gain access to events or transportation, for example, access to buildings, among other applications.

In accordance with one aspect of the present disclosure, a mobile device may provide credentials to an NFC reader, whether the mobile device is in a locked state or powered up.

As used herein, an NFC tag or card is a passive device that stores data that can be read by an NFC enabled device. The terms "card" and "tag" may be used interchangeably. Examples of NFC tags include, for example, a tag embedded in a poster that will allow an NFC enabled device to obtain supplemental information such as a URL when brought into close proximity with the NFC Tag.

An "NFC enabled device" or "NFC reader", as used herein, refer to a device capable of transmitting or receiving on an NFC antenna, and are typically self powered. An NFC enabled device may operate in several modes, including a tag reading and writing mode, which may be used to read or write to passive NFC tags; a peer-to-peer mode which may be used to provide data transfer between NFC enabled devices, such as two mobile devices; and a card emulation mode which allows the NFC enabled device to act like or emulate a card or tag. Card emulation may take place even when the NFC enabled device is powered down.

Reference is now made to FIG. 1, which shows a mobile device 110 having NFC capabilities, as is described in detail below. The mobile device may establish radio communications with other NFC readers or NFC tags. Examples of NFC readers are shown as computing device 120, access control NFC reader 131 and mobile device 140 in the embodiment of FIG. 1.

Specifically, a computing device 120 such as a laptop or a desktop may have a built-in NFC reader. In other embodiments, a laptop or a desktop may connect to a peripheral NFC reader through a Universal Serial Bus (USB) port.

Whether built in or peripheral, the NFC reader allows data exchange between computing device 120 and mobile device 110 using near field communications.

NFC readers may also be provided as stand-alone devices, such as NFC reader 131, for providing access to a door 130. In this case, mobile device 110 may be in a card emulation mode and provide a response to challenge from NFC reader 131 to permit access to door 130. Similar embodiments would exist, for example, with a payment type system where mobile device 110 acts as a digital wallet.

In other embodiments, the NFC enabled device could be another mobile device 140 and peer-to-peer communication could occur between mobile device 110 and mobile device 140. The near field communications could, for example, be used to exchange credentials for a higher bandwidth communications path such as Bluetooth™ to be established between the devices, in some cases.

Figure 2:
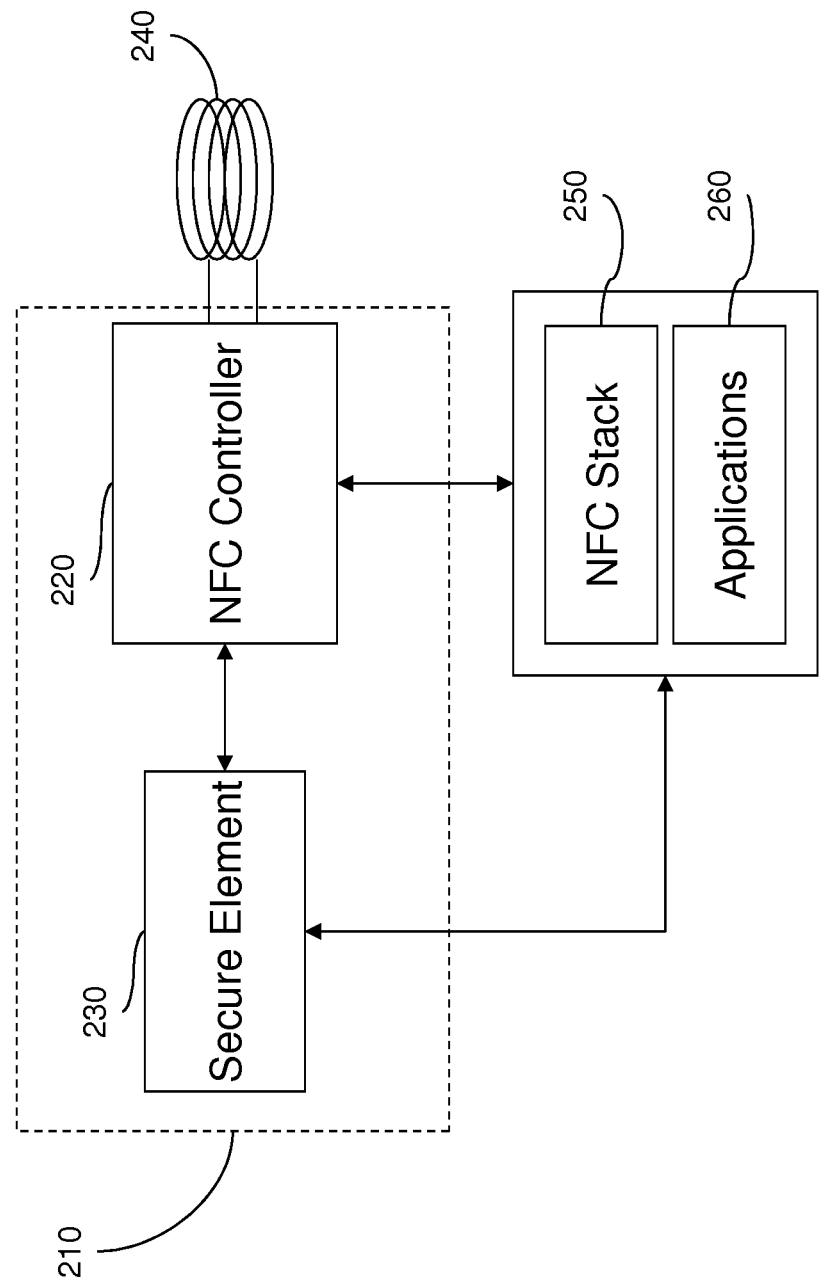
FIG. 2 is a block diagram of NFC components within a mobile device in accordance with the present disclosure.

An NFC circuit may be incorporated onto a mobile device to provide NFC capabilities, and may include the following components: an NFC controller, one or more secure elements, and an NFC antenna. Reference is now made to FIG. 2, which shows a simplified NFC circuit.

The mobile device includes an NFC circuit 210, which comprises the NFC controller 220 and the secure element 230.

The NFC controller 220 interfaces with the NFC antenna 240 and redirects the radio frequency (RF) communication to the secure element 230, amongst other functionality. Typically, NFC controller 220 consists of an NFC Hardware Controller Interface (HCI) and an NFC modem. An NFC controller 220 is responsible for communication with an external NFC reader through NFC antenna 240.

The secure element 230 consists of hardware and a smart card operating system, and is capable of running small applications known as "applets". The secure element 230 provides a secure, tamper proof environment for running applets. In at least some embodiments, regular applications on the mobile device may interact with such applets using one of the NFC Application Programming Interfaces (APIs). In some cases, applets can also interact with external components, such as NFC reader terminals.

Secure element 230 may, in some cases, be embedded within the device itself, and in other embodiments may be embedded in a universal integrated circuit card (UICC), also known as a smart card.

The NFC antenna 240 receives the RF signal from an external NFC reader (not shown). In at least some embodiments, the NFC antenna also provides power to the NFC circuit 210. Specifically, the NFC antenna 240 may have a current induced therein when placed in proximity to the NFC reader signal.

In at least some embodiments, the mobile device further includes an NFC stack 250 for applications 260. NFC stack 250 is a software stack which consists of a series of APIs which device applications 260 can make use of.

Applications 260 are applications which provide whatever required functionality is desired and make use of the NFC APIs for NFC use cases. In at least some embodiments, applications 260 may be written in Java™.

During operation, the NFC reader consistently transmits a signal until it receives a response from an NFC enabled device. In at least one embodiment, the signal includes a challenge, such as a random number. For example, the reader may use a protocol such as that specified by the U.S. Department of Commerce, Federal Information Processing Standards (FIPS), "ENTITY AUTHENTICATION USING PUBLIC KEY CRYPTOGRAPHY", Publication 196, Feb. 18, 1997, the contents of which are incorporated herein by reference.

Upon receiving a correct response to the challenge, the NFC reader may perform further functionality, such as granting access, receiving data or enabling data exchange from the NFC device, among other possibilities.

Using authentication as provided in the FIPS publication 196, in order to successfully respond to the challenge, the NFC device authenticates itself by proving ownership of a public/private key pair certified by a trusted authority. In other embodiments, the verification may use a shared secret or key. The shared key or private key of the public/private key pair is stored in the secure element of the NFC circuit, and the key may not be read by regular applications on the mobile device. Moreover, the public key is certified by a trusted certificate authority in one embodiment, where the public key is digitally signed by the certificate authority to form a "certificate".

Figure 3:
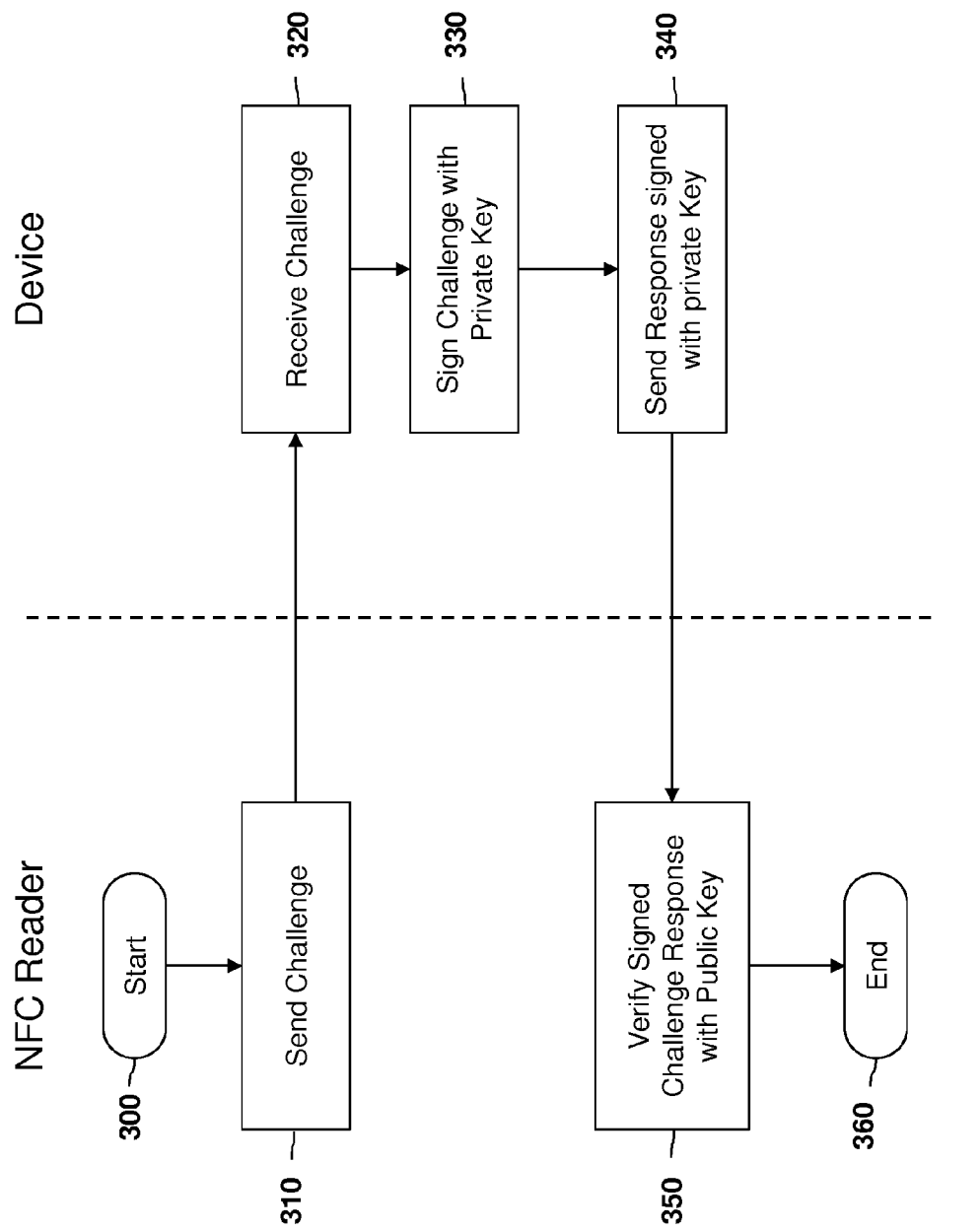
FIG. 3 is a flow diagram of an authentication procedure over NFC in accordance with the present disclosure.

Reference is now made to FIG. 3, which shows the above process. In particular, the process starts at block 300 and proceeds to block 310 in which the NFC reader sends out a challenge. In at least one embodiment, the NFC reader may continually or periodically send out this challenge, until it is responded to by an NFC device. In other embodiments the reader may recognize when an NFC device or tag is brought into proximity of the reader prior to sending out the challenge.

In at least one embodiment, the challenge consists of a random number generated by the NFC reader. In at least one embodiment, the challenge further includes an application identifier, for identifying at least one application for the NFC reader (terminal). The application identifier may originate at the terminal and be propagated through the NFC reader in one embodiment.

The NFC device receives the challenge at block 320 and, if applicable, determines the application identifier. At block 330, the NFC device signs the random number challenge with a key. In at least some embodiments, the key is associated to the application identifier.

At block 340, the NFC device sends the signed random number challenge to the NFC reader along with a device identifier, the device's public key and a public key certificate. At block 350, the NFC reader verifies that the public key belongs to the device by checking the public key certificate and the device identifier, and decrypts the signed challenge with the public key to authenticate the NFC device. Once the NFC device is authenticated, the procedure ends at block 350.

In accordance with one embodiment of the present disclosure, the above may be modified to facilitate two factor authentication for secure login, such as for accessing a Virtual Private Network (VPN) or the like. Two factor authentication consists of granting access to a network by requiring two inputs from a user. For example, two factor authentication may use two different categories of factors, from the following: something the user knows; something the user has; or something the user is.

In the example described below, two factor authentication is based on a dynamic credential which may change periodically, such as every minute or every hour, i.e., something the user has and a constant password or Personal Identification Number (PIN), i.e., something the user knows. However, the present disclosure is not so limited. Notably, the dynamic credential is deemed to be something the user has, because the user is be in possession of a device which provides the dynamic credential to know the current credential. One example of two factor authentication utilizes an RSA SecurID™ system, where the user is required to input a six to eight digit dynamic number as part of the login from a device or fob.

For example, users of certain networks require a device such as a key fob, which computes a new access code periodically. Typically, the access code changes every 30 seconds or every minute according to an algorithm which is executed at the key fob and at a server location. Accordingly the access code computed by the key fob and the access code computed by the server location remain synchronized.

When logging in to the network, the user enters both a password/PIN, as well as the access code which is currently displayed by the key fob. If the password/PIN is correct and the access code is the correct current access code, the user is granted access. In the following disclosure, an access code which changes periodically is referred to as a "dynamic credential".

According to one embodiment of the present disclosure, a mobile device with NFC capabilities may be used to provide the dynamic credential to a terminal. In some embodiments, this may be accomplished by having the NFC circuit on the mobile device include an applet within the secure element to generate the dynamic credential. Specifically, the reader could provide an application identifier that would cause the applet to be invoked to return the dynamic credential. If the NFC on the mobile device was operating in a card emulation mode, the applet could be completely within the secure element and not require external application support. Further, the NFC controller running the applet could be completely powered through an induced current from the reader and thus the dynamic credential could be returned even if no power was supplied from the mobile device.

Figure 4:
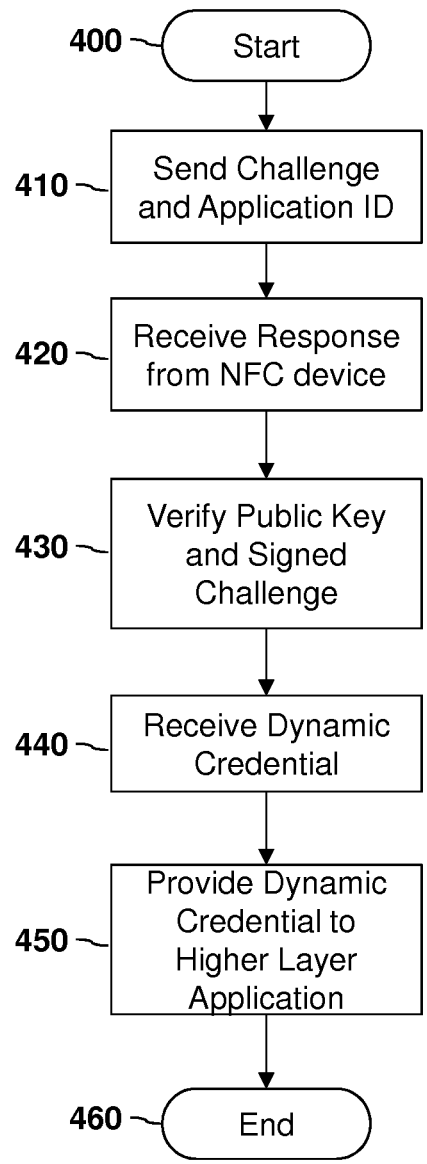
FIG. 4 is a flow diagram of a method for receiving a dynamic credential from the perspective of an NFC reader in accordance with the present disclosure.

The above is described, from the point of view of the NFC reader, with reference to FIG. 4. The NFC reader performing the method of FIG. 4 is connected to a terminal for logging into a computing device or network requiring two factor authentication. For example, the NFC reader may be connected to a laptop or desktop computer via a USB port, or may be built-in to the laptop or desktop. The network may be a remote VPN or a Local Area Network (LAN).

The method starts at block 400 and proceeds to block 410 in which the NFC reader of the computing device sends a challenge (e.g. a random number) with an application ID. In at least some embodiments, the challenge is a random number generated by the NFC reader and the application ID indicates that a value is required for a two factor authentication login. The NFC reader may detect a device in proximity and send a challenge after detection in one embodiment.

At block 420, the NFC reader receives a response from an NFC device. The response includes a device identifier, the random number signed by the NFC device's key, (e.g. private key), and optionally the corresponding public key, and a certificate from a trusted authority. Alternatively, instead of receiving the public key, the NFC reader could use a device identifier to fetch a certificate to see if the signature is accurate.

At block 430, the NFC reader may verify that the public key belongs to the NFC device, for example based on the device identifier and the public key certificate. If the verification fails, the method ends. The NFC reader also verifies that the public key correctly decrypts the signed random number. If this verification fails, the method ends, otherwise the NFC reader is ready to exchange data with the NFC device. In at least some embodiments, the NFC reader sends a signal to the NFC device indicating that authentication was successful.

The method than proceeds to block 440, in which the NFC reader receives a dynamic credential from the NFC device. In at least some embodiments, the dynamic credential is included in the response of block 420 in a payload field, however in other embodiments, the dynamic credential is provided in a separate communication.

At block 450, the NFC reader provides the dynamic credential to a higher layer application. At this point, the method, from the perspective of the NFC reader, ends, and the user may resume logging in to the network. The dynamic credential will be verified by a server, computing device or other network element before access is granted.

From block 450 the process proceeds to block 460 and ends.

Figure 5:
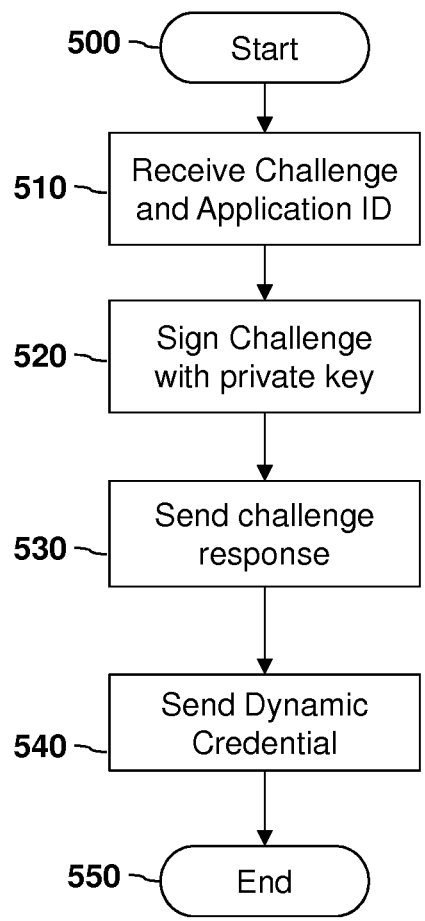
FIG. 5 is a flow diagram of a method for sending a dynamic credential from the perspective of an NFC device in accordance with the present disclosure.

Reference is now made to FIG. 5, which describes the above method from the perspective of the NFC device.

The method starts at block 500 and proceeds to block 510 in which the NFC device receives a challenge and an application ID. As described above, the NFC reader may only transmit the challenge and the application ID when a device is brought into close proximity, or in some embodiments may continuously broadcast a challenge and an application ID. In either case, as the NFC device is brought in proximity to the NFC reader, the NFC device reads the RF signal from the NFC reader and decodes it as a challenge and an application ID. In some embodiments, the field from the NFC reader may power the NFC device.

Notably, the NFC device may read the broadcast from the NFC reader even if the NFC device is powered off, or in a locked state. Specifically, even if no power is provided to the NFC circuit 210 (see FIG. 2) of the NFC device from a battery, the electromagnetic field propagated by the NFC reader will induce a current in the NFC antenna 240 (see FIG. 2). This current is sufficient to power the NFC controller 220 and the secure element 230, allowing the method of FIG. 5 to be performed even when the NFC device is powered off.

Upon detecting the challenge and the application ID, the NFC controller 220 loads an applet corresponding to the application ID. In this example, the corresponding applet is a two factor authentication applet because the application ID indicates two factor authentication. The applet is then executed on the secure element 230.

The authentication procedure is then performed. In at least some embodiments, the authentication procedure is handled by the two factor authentication applet. In other embodiments, the authentication procedure is handled by the NFC controller 220.

The NFC device retrieves its private key, and signs the random number with its private key at block 520. In at least some embodiments, the private key belongs to a public/private key pair which is associated to the two factor authentication applet. In other embodiments, the private key belongs to a general public/private key pair associated to the NFC device. In other embodiments, the key could be a secret key shared by the NFC reader/terminal and the NFC-capable device.

The NFC device then sends a device identifier, the signed random number challenge, and optionally the public key, and a certificate in block 530. As would be appreciated by those skilled in the art, if public key/private key cryptography is used, the public key corresponds to the private key used to sign the random number challenge, and the certificate shows that the public key belongs to the device associated to the device identifier. In at least some embodiments, the public key certificate is issued by a trusted authority.

The two factor authentication applet may then read the current dynamic credential. In at least some embodiments, the current dynamic credential is computed by the two factor authentication applet from the current time. However, other methods of computing the current dynamic credential are within the scope of the present disclosure. In some cases some battery power may be needed to allow a clock to run to seed the dynamic credential at the NFC device.

When the dynamic credential is based on the current time, the current time may be obtained from the NFC reader. Alternatively, the mobile device may include a timer circuit, powered by a dedicated battery or the device battery, to provide the applet the current time when required. Such timer circuit may be synchronized periodically, for example with a network clock when the mobile device is powered up. As would be appreciated by those skilled in the art, a timer circuit such as this would consume very little power, and could be powered by a small dedicated battery or the device battery, and could therefore function even if the processor or processors of mobile device are powered off.

The two factor authentication applet then transmits the current dynamic credential to the NFC reader by invoking the NFC controller 220, at block 540. In at least some embodiments, the current dynamic credential is provided in the response to the challenge in a payload field. In other embodiments, the current dynamic credential is provided in a separate communication. Furthermore, in at least some embodiments, the NFC device waits for a confirmation that authentication was successful before sending the current dynamic credential.

After block 540, the method ends at block 550.

While the embodiments of FIGS. 4 and 5 use a challenge and private key/public key pair to verify the device prior to providing the dynamic credential, in other embodiments the device could provide the dynamic credential without such device verification. Thus, the device could merely receive an application identifier in an NFC request, and based on the application identifier provide a dynamic credential. In this case, the algorithm used to create the dynamic credential may be designed appropriately to ensure security.

Figure 6:
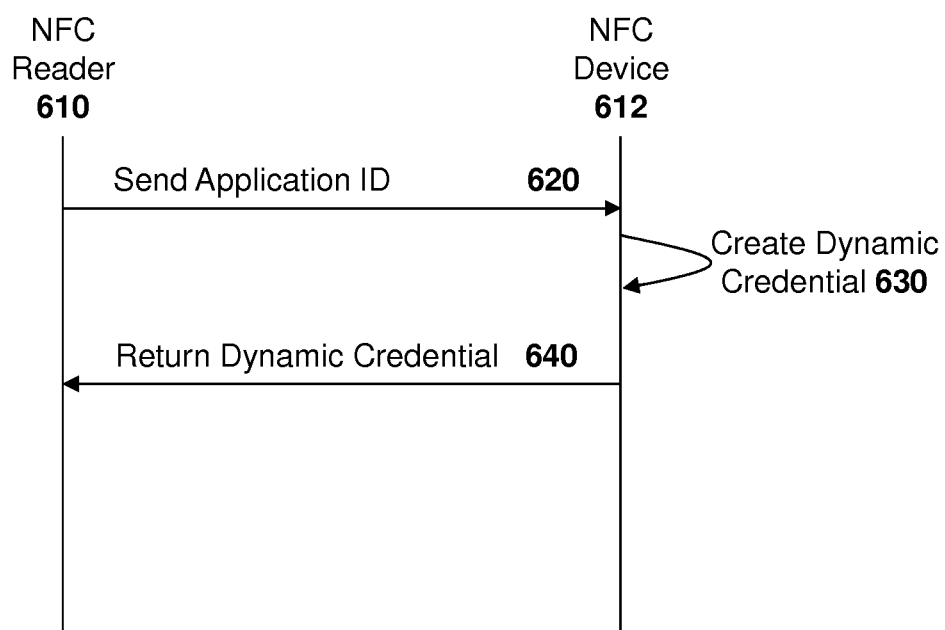
FIG. 6 is a data flow diagram showing an embodiment for providing keys between an NFC reader and an NFC device.

For example, reference is made to FIG. 6. In the embodiment of FIG. 6, NFC reader 610 communicates with an NFC device 612. The communication may occur, for example, when NFC device 612 comes into close proximity to NFC reader 610.

NFC reader 610 continuously broadcasts an application ID in the embodiment of FIG. 6, as shown by arrow 620. However, in other embodiments the message at arrow 620 could be sent in response to the NFC device 612 coming into close proximity to NFC reader 610. Once the NFC device 612 receives the application ID, it invokes the applet corresponding to the application ID to create a dynamic credential, as shown by arrow 630. Again, the dynamic credential could be created based on a time, in which case a clock value may need to be accessed by the applet.

The NFC device 612 then returns the dynamic credential to NFC reader 610, as shown by arrow 640.

In one embodiment the credential is returned without any encryption.

In other embodiments the credential may be returned utilizing a key stored at the NFC device. If the credential is encrypted, then the NFC reader 610 will need to decrypt the credential utilizing a key associated with the device's key. For example, the reader may send a public key to the device to use for encryption, wherein the reader then uses a private key to decrypt the credential. In other cases, the key is a shared secret between the reader and the device. In some embodiments, the device may also return an identifier to allow the reader to associate the correct key with the device.

Other examples of returning a dynamic credential to an NFC reader are possible.

The applet used to create the dynamic credential is part of the secure element to allow the applet to run even without device power. The applet may be loaded onto the secure element at the time of device manufacture, or may subsequently be loaded onto the device. Security for the loading of applets into secure elements could limit such loading to trusted entities.

Accordingly, there is provided a method and device for providing a dynamic credential in a two factor authentication system using an NFC device. The NFC device can provide the dynamic credential to an NFC reader by bringing the NFC device in close proximity to the NFC reader, even if the NFC device is turned off or in a locked state. This saves a user from having to input the dynamic credential manually and streamlines the authentication process.

In at least some embodiments, the NFC device is a mobile device having the NFC hardware as shown in FIG. 2. In other embodiments, the NFC device is a stand alone NFC device with no additional functionality or hardware than as described herein.

Figure 7:
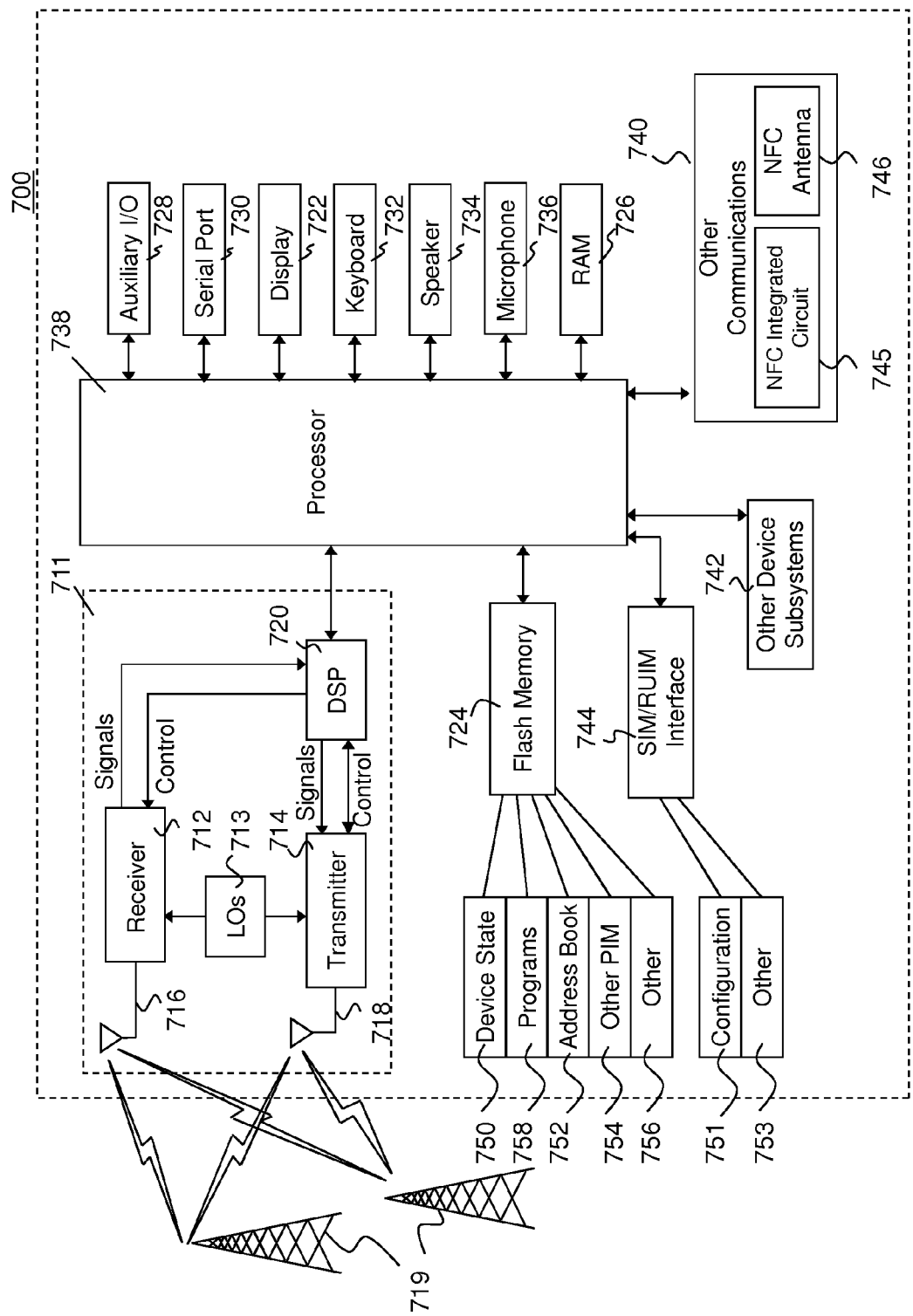
FIG. 7 is a block diagram of an example mobile device.

If the above is implemented on a mobile device, it may be implemented using any mobile device having NFC capability. One exemplary device is described below with regard to FIG. 7. The example of FIG. 7 is however not limiting, and other devices can be used.

Mobile device 700 is typically a two-way wireless communication device having voice and data communication capabilities. Mobile device 700 generally has the capability to communicate with other computer systems on the Internet. Depending on the exact functionality provided, the mobile device may be referred to as a data messaging device, a two-way pager, a wireless e-mail device, a cellular telephone with data messaging capabilities, a wireless Internet appliance, a wireless device, a mobile device, or a data communication device, as examples.

Where mobile device 700 is enabled for two-way communication, it may incorporate a communication subsystem 711, including both a receiver 712 and a transmitter 714, as well as associated components such as one or more antenna elements 716 and 718, local oscillators (LOs) 713, and a processing module such as a digital signal processor (DSP) 720. As will be apparent to those skilled in the field of communications, the particular design of the communication subsystem 711 will be dependent upon the communication network in which the device is intended to operate. The radio frequency front end of communication subsystem 711 can be any of the embodiments described above.

Network access requirements will also vary depending upon the type of network 719. In some networks network access is associated with a subscriber or user of mobile device 700. A mobile device may require a removable user identity module (RUIM) or a subscriber identity module (SIM) card in order to operate on a network. The SIM/RUIM interface 744 is normally similar to a card-slot into which a SIM/RUIM card can be inserted and ejected. The SIM/RUIM card can have memory and hold many key configurations 751, and other information 753 such as identification, and subscriber related information.

When required network registration or activation procedures have been completed, mobile device 700 may send and receive communication signals over the network 719.

As illustrated in FIG. 7, network 719 can consist of multiple base stations communicating with the mobile device.

Signals received by antenna 716 through communication network 719 are input to receiver 712, which may perform such common receiver functions as signal amplification, frequency down conversion, filtering, channel selection and the like. A/D conversion of a received signal allows more complex communication functions such as demodulation and decoding to be performed in the DSP 720. In a similar manner, signals to be transmitted are processed, including modulation and encoding for example, by DSP 720 and input to transmitter 714 for digital to analog conversion, frequency up conversion, filtering, amplification and transmission over the communication network 719 via antenna 718. DSP 720 not only processes communication signals, but also provides for receiver and transmitter control. For example, the gains applied to communication signals in receiver 712 and transmitter 714 may be adaptively controlled through automatic gain control algorithms implemented in DSP 720.

Mobile device 700 generally includes a processor 738 which controls the overall operation of the device. Communication functions, including data and voice communications, are performed through communication subsystem 711. Processor 738 also interacts with further device subsystems such as the display 722, flash memory 724, random access memory (RAM) 726, auxiliary input/output (I/O) subsystems 728, serial port 730, one or more keyboards or keypads 732, speaker 734, microphone 736, other communication subsystem 740 such as a short-range communications subsystem and any other device subsystems generally designated as 742. Serial port 730 could include a USB port or other port known to those in the art.

In particular, the other communication subsystem 740 includes a near field communication (NFC) system, comprising an NFC circuit 745 and NFC antenna 746. The NFC communication system is described in greater detail above with reference to FIG. 2.

Some of the subsystems shown in FIG. 7 perform communication-related functions, whereas other subsystems may provide "resident" or on-device functions. Notably, some subsystems, such as keyboard 732 and display 722, for example, may be used for both communication-related functions, such as entering a text message for transmission over a communication network, and device-resident functions such as a calculator or task list.

Operating system software used by the processor 738 may be stored in a persistent store such as flash memory 724, which may instead be a read-only memory (ROM) or similar storage element (not shown). Those skilled in the art will appreciate that the operating system, specific device applications, or parts thereof, may be temporarily loaded into a volatile memory such as RAM 726. Received communication signals may also be stored in RAM 726.

As shown, flash memory 724 can be segregated into different areas for both computer programs 758 and program data storage 750, 752, 754 and 756. These different storage types indicate that each program can allocate a portion of flash memory 724 for their own data storage requirements. Processor 738, in addition to its operating system functions, may enable execution of software applications on the mobile device. A predetermined set of applications that control basic operations, including at least data and voice communication applications for example, will normally be installed on mobile device 700 during manufacturing. Other applications could be installed subsequently or dynamically.

Applications and software may be stored on any computer readable storage medium. The computer readable storage medium may be a tangible or in transitory/non-transitory medium such as optical (e.g., CD, DVD, etc.), magnetic (e.g., tape) or other memory known in the art.

One software application may be a personal information manager (PIM) application having the ability to organize and manage data items relating to the user of the mobile device such as, but not limited to, e-mail, calendar events, voice mails, appointments, and task items. Naturally, one or more memory stores would be available on the mobile device to facilitate storage of PIM data items. Such PIM application may have the ability to send and receive data items, via the wireless network 719. Further applications may also be loaded onto the mobile device 700 through the network 719, an auxiliary I/O subsystem 728, serial port 730, short-range communications subsystem 740 or any other suitable subsystem 742, and installed by a user in the RAM 726 or a non-volatile store (not shown) for execution by the processor 738. Such flexibility in application installation increases the functionality of the device and may provide enhanced on-device functions, communication-related functions, or both. For example, secure communication applications may enable electronic commerce functions and other such financial transactions to be performed using the mobile device 700.

In a data communication mode, a received signal such as a text message or web page download will be processed by the communication subsystem 711 and input to the processor 738, which may further process the received signal for output to the display 722, or alternatively to an auxiliary I/O device 728.

A user of mobile device 700 may also compose data items such as email messages for example, using the keyboard 732, which may be a complete alphanumeric keyboard or telephone-type keypad, among others, in conjunction with the display 722 and possibly an auxiliary I/O device 728. Such composed items may then be transmitted over a communication network through the communication subsystem 711.

For voice communications, overall operation of mobile device 700 is similar, except that received signals would typically be output to a speaker 734 and signals for transmission would be generated by a microphone 736. Alternative voice or audio I/O subsystems, such as a voice message recording subsystem, may also be implemented on mobile device 700. Although voice or audio signal output is generally accomplished primarily through the speaker 734, display 722 may also be used to provide an indication of the identity of a calling party, the duration of a voice call, or other voice call related information for example.

Serial port 730 in FIG. 7 would normally be implemented in a personal digital assistant (PDA)-type mobile device for which synchronization with a user's desktop computer (not shown) may be desirable, but is an optional device component. Such a port 730 would enable a user to set preferences through an external device or software application and would extend the capabilities of mobile device 700 by providing for information or software downloads to mobile device 700 other than through a wireless communication network. The alternate download path may for example be used to load an encryption key onto the device through a direct and thus reliable and trusted connection to thereby enable secure device communication. As will be appreciated by those skilled in the art, serial port 730 can further be used to connect the mobile device to a computer to act as a modem or to a power source for charging.

Other communications subsystems 740, such as a short-range communications subsystem, is a further optional component which may provide for communication between mobile device 700 and different systems or devices, which need not necessarily be similar devices. For example, the subsystem 740 may include an infrared device and associated circuits and components or a Bluetooth™ communication module to provide for communication with similarly enabled systems and devices. Subsystem 740 may further include non-cellular communications such as WiFi or WiMAX.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

The invention claimed is:

1. A method at a short range communications capable device for providing a dynamic credential to a terminal controlling access to a resource, the method comprising:
   receiving, utilizing near field communications, an application identifier, a current time, and a random number from a reader associated with the terminal;
   retrieving an encryption key, the encryption key corresponding to the application identifier;
   transmitting, to the terminal, a response including a device identifier and the random number signed with the encryption key;
   executing an applet on a secure element of the short range communications capable device, the applet corresponding to the application identifier;
   computing, with the applet, the dynamic credential based on the current time; and
   transmitting the dynamic credential to the reader;
   wherein access to the resource is provided upon transmitting a valid dynamic credential and a valid signature corresponding to the signed random number; and
   wherein the application identifier indicates two factor authentication.

2. The method of claim 1, wherein the dynamic credential is updated periodically.

3. The method of claim 1, wherein the short range communications capable device includes a powered timer circuit.

4. The method of claim 1, wherein the short range communications capable device is a near field communications (NFC) capable device, including an NFC subsystem powered by induction when placed in proximity to the reader.

5. The method of claim 1, wherein the encryption key is stored in a secure element of the short range communications capable device.

6. The method of claim 1, further comprising receiving an indication at the short range communications capable device, that authentication was successful.

7. The method of claim 1, wherein the response includes the dynamic credential in a payload field.

8. The method of claim 1, wherein the dynamic credential is for a login to a network requiring two factor authentication.

9. The method of claim 1 wherein the short range communications capable device is a mobile communications device.

10. The method of claim 1 wherein the short range communications capable device is a dedicated dynamic credential providing device.

11. A short range communications capable device for providing a dynamic credential to a terminal controlling access to a resource, the short range communications capable device comprising:
    an antenna;
    a controller; and
    at least one secure element,
    wherein the antenna, controller and at least one secure element are configured to:
      receive an application identifier, a current time, and a random number from a reader associated with the terminal;
      retrieve an encryption key, the encryption key corresponding to the application identifier;
      transmit, to the terminal, a response including a device identifier and the random number signed with the encryption key;
      execute an applet on a secure element of the short range communications capable device, the applet corresponding to the application identifier;
      compute, with the applet, the dynamic credential based on the current time; and
      transmit the dynamic credential to the reader;
      wherein access to the resource is provided upon transmitting a valid dynamic credential and a valid signature corresponding to the signed random number; and
      wherein the application identifier indicates two factor authentication.

12. The short range communications capable device of claim 11, wherein the dynamic credential is updated periodically.

13. The short range communications capable device of claim 11, wherein the short range communications capable device includes a powered timer circuit.

14. The short range communications capable device of claim 11, wherein the short range communications capable device is a near field communications (NFC) capable device powered by induction when placed in proximity to the reader.

15. The short range communications capable device of claim 11, wherein the encryption key is stored in a secure element of the short range communications capable device.

16. The short range communications capable device of claim 11, wherein the dynamic credential is for a login to a network requiring two factor authentication.

17. A non-transitory computer-readable medium having instructions stored thereon for execution by a processor of a short range communications capable device, the instructions comprising code for:
    receiving, utilizing near field communications, an application identifier, a current time, and a random number from a reader associated with a terminal, the terminal controlling access to a resource;
    retrieving an encryption key, the encryption key corresponding to the application identifier;
    transmitting, to the terminal, a response including a device identifier and the random number signed with the encryption key;
    executing an applet on a secure element of the short range communications capable device, the applet corresponding to the application identifier;

computing, with the applet, the dynamic credential based on the current time; and transmitting the dynamic credential to the reader;

wherein access to the resource is provided upon transmitting a valid dynamic credential and a valid signature corresponding to the signed random number; and wherein the application identifier indicates two factor authentication.

18. The non-transitory computer-readable medium of claim 17, wherein the dynamic credential is updated periodically.

19. The non-transitory computer-readable medium of claim 17, wherein the short range communications capable device includes a powered timer circuit.

20. The non-transitory computer-readable medium of claim 17, wherein the short range communications capable device is a near field communications (NFC) capable device, including an NFC subsystem powered by induction when placed in proximity to the reader.

21. The non-transitory computer-readable medium of claim 17, wherein the encryption key is stored in a secure element of the short range communications capable device.

22. The non-transitory computer-readable medium of claim 17, wherein the instructions comprise code for receiving an indication at the short range communications capable device, that authentication was successful.

23. The non-transitory computer-readable medium of claim 17, wherein the response includes the dynamic credential in a payload field.

24. The non-transitory computer-readable medium of claim 17, wherein the dynamic credential is for a login to a network requiring two factor authentication.

25. The non-transitory computer-readable medium of claim 17, wherein the short range communications capable device is a mobile communications device.

26. The non-transitory computer-readable medium of claim 17, wherein the short range communications capable device is a dedicated dynamic credential providing device.

* * * * *

UNITED STATES PATENT AND TRADEMARK OFFICE
CERTIFICATE OF CORRECTION

PATENT NO. : 9,594,896 B2  
APPLICATION NO. : 13/723429  
DATED : March 14, 2017  
INVENTOR(S) : Anthony Rosati Page 1 of 1

It is certified that error appears in the above-identified patent and that said Letters Patent is hereby corrected as shown below:

On the Title Page

Column 1, please amend Assignee from "BlackBerry Limited" to "Certicom Corp."

Signed and Sealed this  
Third Day of October, 2017

Joseph Matal  
*Performing the Functions and Duties of the*  
*Under Secretary of Commerce for Intellectual Property and*  
*Director of the United States Patent and Trademark Office*